wu et al.

(12) United States Patent
Wu et al.

(10) Patent No.: US 10,864,485 B2
(45) Date of Patent: Dec. 15, 2020

(54) ASYMMETRIC MEMBRANES

(71) Applicant: Georgia Southern Research and Service Foundation, Inc., Statesboro, GA (US)

(72) Inventors: Ji Wu, Statesboro, GA (US); Hao Chen, Statesboro (CN); Ian Byrd, Statesboro, GA (US)

(73) Assignee: Georgia Southern Research and Service Foundation, Inc., Statesboro, GA (US)

( * ) Notice: Subject to any disclaimer, the term of this patent is extended or adjusted under 35 U.S.C. 154(b) by 0 days.

(21) Appl. No.: 16/566,466

(22) Filed: Sep. 10, 2019

(65) Prior Publication Data

US 2020/0001247 A1 Jan. 2, 2020

Related U.S. Application Data

(62) Division of application No. 15/584,122, filed on May 2, 2017, now Pat. No. 10,427,106.

(60) Provisional application No. 62/330,552, filed on May 2, 2016.

(51) Int. Cl.

| | |
|---|---|
| *B01D 71/02* | (2006.01) |
| *C01B 32/158* | (2017.01) |
| *B01D 67/00* | (2006.01) |
| *H01M 4/04* | (2006.01) |
| *H01M 4/133* | (2010.01) |
| *H01M 4/134* | (2010.01) |
| *H01M 4/1393* | (2010.01) |
| *H01M 4/1395* | (2010.01) |
| *H01M 4/36* | (2006.01) |
| *H01M 4/38* | (2006.01) |
| *H01M 4/48* | (2010.01) |
| *H01M 4/66* | (2006.01) |
| *H01M 4/80* | (2006.01) |
| *H01M 10/0525* | (2010.01) |
| *B01D 69/02* | (2006.01) |
| *H01M 4/02* | (2006.01) |

(52) U.S. Cl.
CPC ......... *B01D 71/02* (2013.01); *B01D 67/0067* (2013.01); *B01D 71/021* (2013.01); *C01B 32/158* (2017.08); *H01M 4/0471* (2013.01); *H01M 4/133* (2013.01); *H01M 4/134* (2013.01); *H01M 4/1393* (2013.01); *H01M 4/1395* (2013.01); *H01M 4/364* (2013.01); *H01M 4/386* (2013.01); *H01M 4/483* (2013.01); *H01M 4/663* (2013.01); *H01M 4/80* (2013.01); *B01D 69/02* (2013.01); *B01D 2325/023* (2013.01); *B01D 2325/04* (2013.01); *B01D 2325/26* (2013.01); *H01M 10/0525* (2013.01); *H01M 2004/021* (2013.01)

(58) Field of Classification Search
CPC .. B01D 71/02; B01D 67/0067; B01D 71/021; B01D 69/02; B01D 2325/023; B01D 2325/04; B01D 2325/26; H01M 4/0471; H01M 4/133; H01M 4/134; H01M 4/1393; H01M 4/1395; H01M 4/364; H01M 4/386; H01M 4/483; H01M 4/663; H01M 4/80; H01M 2004/021; H01M 10/0525; C01B 32/158
See application file for complete search history.

(56) References Cited

U.S. PATENT DOCUMENTS

| | | | | |
|---|---|---|---|---|
| 2015/0287997 | A1* | 10/2015 | Zhang | H01M 4/505 429/212 |
| 2016/0001237 | A1* | 1/2016 | Halbach | B01D 69/10 210/654 |
| 2017/0001153 | A1 | 1/2017 | Ichinose et al. | |
| 2018/0021741 | A1* | 1/2018 | Sano | B32B 27/304 95/51 |

OTHER PUBLICATIONS

Beattie, et al., "Understanding capacity fade in silicon based electrodes for lithium ion batteries using three electrode cells and upper cut-off voltage studies", Journal of Power Sources 302 (2016) 426e430.
Byrd, et al., "Self-assembled asymmetric membrane containing micron-size germanium for high capacity lithium ion batteries", RSC Adv., 2015, 5, 92878.
Chen, et al., "Pyrolytic carbon-coated silicon/carbon nanofiber composite anodes for high-performance lithium-ion batteries", Journal of Power Sources 298 (2015) 130e137.
Chen, et al., "High-Areal-Capacity Silicon Electrodes with Low-Cost Silicon Particles Based on Spatial Control of Self-Healing Binder", Adv. Energy Mater., (2015), 5: 1401826.
Eom, et al., "The design of a Li-ion full cell battery using a nano silicon and nano multi-layer graphene composite anode", Journal of Power Sources 249, (2014), 118e124.
Greenlee, et al., "Reverse osmosis desalination: Water sources, technology, and today's challenges", Water Research 43, (2009), 2317-2348.
Kim, et al., "Three-dimensional silicon/carbon core shell electrode as an anode material for lithium-ion batteries", Journal of Power Sources 279 (2015) 13e20.

(Continued)

*Primary Examiner* — Muhammad S Siddiquee
(74) *Attorney, Agent, or Firm* — Meunier Carlin & Curfman LLC

(57) ABSTRACT

Disclosed herein are porous asymmetric silicon membranes. The membranes are characterized by high structural stability, and as such are useful as anode components in lithium ion batteries.

12 Claims, 18 Drawing Sheets

(56) References Cited

OTHER PUBLICATIONS

Kim, et al., Thermally Controlled V2O5 Nanoparticles as Cathode Materials for Lithium-Ion Batteries with Enhanced Rate Capability, Electrochimica Acta 164 (2015) 227-234.

Klossek, et al., "Growth process of microcrystalline silicon studied by combined photoluminescence and Raman investigations", Journal of Applied Physics 114, (2013), 223511.

Leblanc, et al., "Silicon as anode for high-energy lithium ion batteries: From molten ingot to nanoparticles", Journal of Power Sources 299 (2015) 529-536.

Lee, et al., "Fracture of crystalline germanium during electrochemical lithium insertion", Extreme Mechanics Letters 2 (2015) 15-19.

Lin, et al., "A high tap density secondary silicon particle anode fabricated by scalable mechanical pressing for lithium-ion batteries", Energy Environ. Sci., (2015), 8, 2371.

Li, et al., Hollow carbon nanospheres/silicon/alumina core-shell film as an anode for lithium-ion batteries, Scientific Reports (2014), 5:7659.

Liu, et al., "Size-Dependent Fracture of Silicon Nanoparticles During Lithiation", AcsNano (2012), 1522-1531.

Magasinski, et al., High-performance lithium-ion anodes using a hierarchical bottom-up approach, Nat Mat. (2010), 353-358.

McDowell, et al., In Situ TEM of Two-Phase Lithiation of Amorphous Silicon Nanospheres, Nano Letters, 2013, 758-764.

Nadimpalli, et al., "Quantifying capacity loss due to solid-electrolyte-interphase layer formation on silicon negative electrodes in lithium-ion batteries", Journal of Power Sources 215 (2012) 145e151.

Nishikawa, et al., "In-situ observation of volume expansion behavior of a silicon particle in various electrolytes", Journal of Power Sources 302 (2016) 46e52.

Nitta, et al., "Li-ion battery materials: present and future", Materials Today 18, (2015), 13 pages.

Nitta, et al., "High-Capacity Anode Materials for Lithium-Ion Batteries: Choice of Elements and Structures for Active Particles", Part. Part. Syst. Charact. (2014), 31, 317-336.

Obrovac, et al., Structural Changes in Silicon Anodes during Lithium Insertion/Extraction, Electrochem. Solid-State Lett. (2004) 7(5):A93-A96.

Obrovac, et al., "Reversible Cycling of Crystalline Silicon Powder", J. Electrochem. Soc. (2007) 154(2): A103-A108.

Ruffo, et al., "Impedance Analysis of Silicon Nanowire Lithium Ion Battery Anodes", J. Phys. Chem. C (2009), 113, 11390-11398.

Sanders, et al., Energy-efficient polymeric gas separation membranes for a sustainable future: A review, Polymer 54 (2013) 4729e4761.

Todica, et al., "UV-Vis and XRD investigation of graphite-doped poly(acrylic) acid membranes", Turk J Phys 2014, 38: 261-267.

Wang, et al., "Self-healing chemistry enables the stable operation of silicon microparticle anodes for high-energy lithium-ion batteries", Nat Chem, (2013), 1042-1048.

Wang, et al., "Foamed mesoporous carbon/silicon composite nanofiber anode for lithium ion batteries", Journal of Power Sources 281 (2015) 285e292.

Wu, et al., "In Situ Formed Si Nanoparticle Network with Micron-Sized Si Particles for Lithium-Ion Battery Anodes", NanoLetters, (2013), 13, 5397-5402.

Xiao, et al. "Enhancement of Electrochemical Stability about Silicon/Carbon Composite Anode Materials for Lithium Ion Batteries", Journal of Nanomaterials, (2015), 926256, 6 pages.

Zhang, et al., "Nanocrystalline silicon carbide thin film electrodes for lithium-ion batteries", Solid State Ionics 263 (2014) 23-26.

Zhao, et al., Artificial Solid Electrolyte Interphase-Protected LixSi Nanoparticles: An Efficient and Stable Prelithiation Reagent for Lithium-Ion Batteries, J. Am. Chem. Soc. (2015), 137, 8372-8375.

* cited by examiner

NMP: N-methyl-2-pyrrolidone
VOTEO: vanadium (V) oxytriethoxide
PS: polysulfone
CB: carbon black
GH: graphene

ASYMMETRIC MEMBRANES

CROSS REFERENCE TO RELATED APPLICATION

This application is a divisional of U.S. application Ser. No. 15/584,122, filed May 2, 2017, which claims the benefit of U.S. Provisional Application 62/330,552, filed on May 2, 2016, the contents of which are hereby incorporated in their entireties.

FIELD OF THE INVENTION

The invention is generally directed to asymmetric membranes having nanoporous and macroporous domains. The membranes are useful components in rechargeable batteries such as lithium ion batteries.

BACKGROUND

Rechargeable lithium ion batteries are used in a wide variety of different applications. Lithium metal can be used at the anode, however, lithium ions tends to deposit in dendritic fashion, leading to poor columbic efficiency. Furthermore, metallic lithium particles can break free from the anode and mix with the electrolyte. If the dislodged metallic particles contact the cathode shorting can arise. Carbonaceous anodes, which allow the reversible intercalation of lithium ions within the carbonaceous material, have been developed as an alternative. The maximum amount of lithium that can be intercalated within the graphite structure is 1 per 6 carbon atoms, yielding a specific capacity of 372 mAh/g. Silicon is an attractive alternative to carbon, at least in part because it has a substantially higher capacity (4200 mAh/g). However, silicon anodes have not been widely adopted due to poor mechanical stability and the large volume variation (~300%) between lithiated and de-lithiated states. Because of the substantial volume change during charge/recharge cycles, traditional silicon anodes undergo rapid pulverization, thereby diminishing battery capacity. Fractured silicon can also consume electrolyte to form a solid interphase, further lowering columbic efficiency. Thus, there is a need for silicon anodes with increased structural stability. There is also a need for lithium ion batteries having silicon anodes which do not lose efficiency over charging cycles.

SUMMARY

Disclosed herein are asymmetric membranes including both lithium storage materials with enhanced structural stability. The membranes can be used as an electrode in a lithium ion battery. The asymmetric membranes have a least two portions of a porous lithium storage material, for instance silicon, tin dioxide or vanadium pentoxide. The first portion is characterized by a nanoporous structure that is permeable to lithium ions. The second portion is characterized by substantially larger voids (e.g., negative spaces), channels or pores which accommodate the expanding volume of the material over charging cycles. The asymmetric membranes can be prepared by a phase inversion of a lithium storage material and carbonaceous particles suspended in in a polymeric solution. The asymmetric membranes can have one or more additional skin layers, wherein the skin layer includes an asymmetric carbonaceous porous membrane or conductive polymer.

DETAILED DESCRIPTION

Figure 1A:
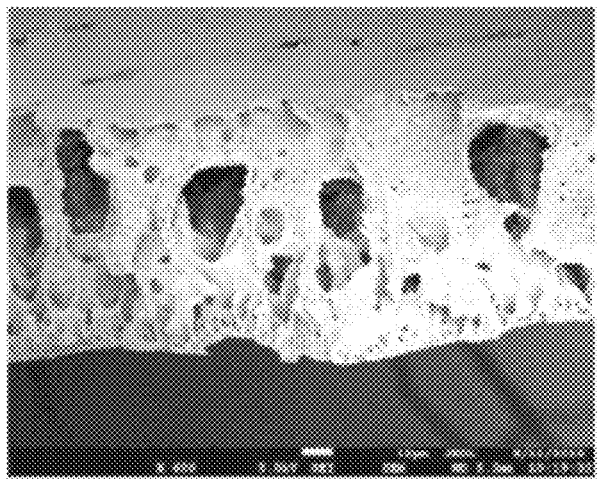
FIG. 1 includes scanning electron microscope images of: 1A) uncarbonized PAN (polyacrylonitrile)/Si; 1B) uncarbonized CA/PAN/Si; 1C) uncarbonized CA/PAN/Si/CA; 1D) carbonized PAN/Si; 1E) carbonized CA/PAN/Si; and 1F) carbonized CA/PAN/Si/CA.
Figure 1B:
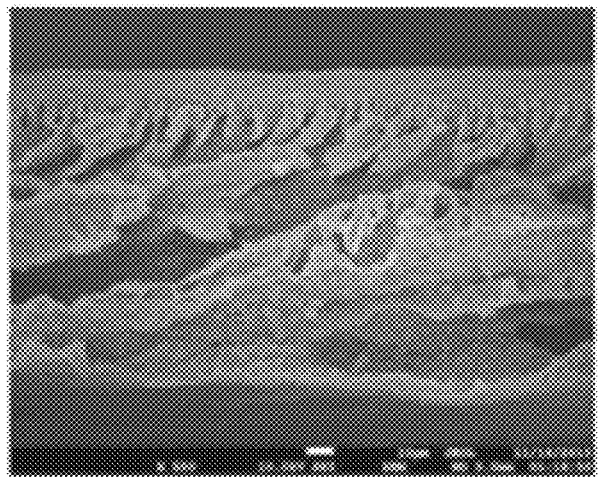
Figure 1C:
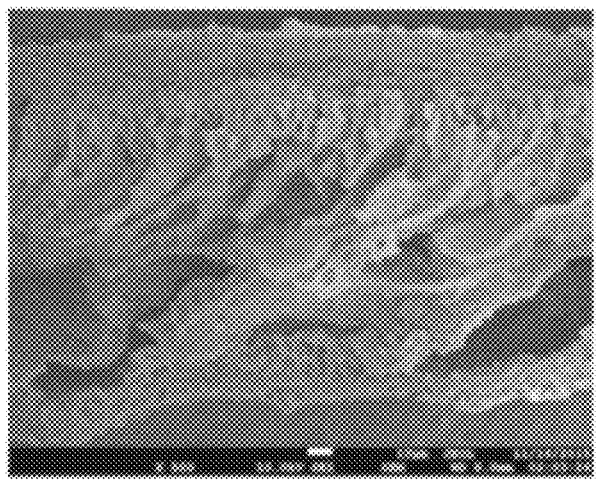

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed herein are asymmetric porous membranes that include at least one a lithium storage material. As used herein, the term "asymmetric" refers to membranes having different pore shapes and/or sizes across the thickness of the membrane. As used herein, a lithium storage material is a material that can intercalate and store lithium. In some embodiments, the lithium storage material can include silicon, or tin dioxide.

In addition to the lithium storage material, the asymmetric membranes can also contain amorphous carbon and/or (para) crystalline carbon. In certain preferred embodiments, the asymmetric membranes contain silicon, amorphous carbon and (para)crystalline carbon. In certain preferred embodiments, the asymmetric membranes contain tin dioxide, amorphous carbon and (para) crystalline carbon. In certain preferred embodiments, the asymmetric membranes contain vanadium pentoxide, amorphous carbon and (para) crystalline carbon. As used herein, amorphous carbon includes materials obtained from the carbonization of certain polymers, including polyacrylonitriles, polysulfones, cellulose acetates and polyamides. As used herein, (para)crystalline carbon includes carbon black, fullerenes, carbon nanotubes, graphene and graphite. In certain embodiments, the lithium storage material is present in an amount from about 10-90%, about 10-80%, about 10-70%, about 10-60%, about 10-50%, about 10-40%, about 20-80%, about 25-75%, about 25-60%, about 35-60%, or about 45-55%, by weight relative to the total weight of the membrane. The lithium storage material content (e.g., silicon, tin dioxide or vanadium pentoxide) can be determined by subjecting the asymmetric membrane to thermogravimetric analysis such that essentially all the carbon is oxidized and lost as $CO_2$ gas, whereas the lithium storage material is inert and is not lost.

The asymmetric membrane can have a thickness that is at least about 1 µm, at least about 10 µm, at least about 25 µm, at least about 50 µm, at least about 75 µm, at least about 100 µm, or at least about 200 µm. In some embodiments, the asymmetric membrane can have a thickness from about 1-500 µm, about 25-400 µm, about 25-250 µm, about 50-250 µm, about 75-250 µm, about 100-250 µm, about 150-250 µm, or about 100-200 µm. In some instances, the asymmetric membrane can have a thickness that is about 25 µm, about 50 µm, about 75 µm, about 100 µm, about 150 µm, about 200 µm, about 250 µm, about 300 µm, about 400 µm, or about 500 µm.

The asymmetric membranes have at least two different zones or layers of porous lithium storage material. The first zone is a nanoporous layer extending over the entire surface of the membrane. Generally, this layer is thin relative to the thickness of the entire membrane. The nanoporous layer can be about 0.001-10 µm thick, about 0.01-5 µm thick, about 0.05-5 µm thick, about 0.1-5 µm thick, about 0.25-5 µm thick, about 0.5-5 µm thick, about 0.25-2.5 µm thick, about 0.5-2.5 µm thick, or about 1.0-2.5 µm thick. In some embodiments, the nanopores have an average pore diameter of less than about 200 nm, about 150 nm, about 100 nm, about 75 nm, about 50 nm, or about 25 nm. In certain embodiment, at least 80% of the nanopores have a pore diameter less than about 200 nm, about 150 nm, about 100 nm, about 75 nm, or about 50 nm. As used herein, pore size refers average pore size which may be determined by a porosity analyzer combined with BJH (Brunauer, Emmet, and Teller) method.

The second zone (i.e., the macroporous zone) in the asymmetric membrane contains larger negative spaces. The second zone makes up the bulk of the membrane; typically the thickness of the second zone is at least about 90%, at least about 95%, at least about 97.5%, or at least about 99%, the total thickness of the asymmetric membrane. The negative spaces can be designated "macrovoids" and include macropores and macrochannels. The macrovoids have a diameter of at least about 250 nm, at least about 500 nm, at least about 750 nm, at least about 1 µm, at least about 2 µm, at least about 3 µm, at least about 4 µm, at least about 5 µm, at least about 6 µm, at least about 7 µm, at least about 8 µm, at least about 9 µm, or at least about 10 µm. When the macrovoids are macrochannels, the length of the macrochannels is at least about 50%, about 55%, about 60%, about 65%, about 70%, about 75%, about 80%, about 85%, about 90% or about 95%, the total thickness of the membrane. In certain embodiments, the asymmetric membrane contains two nanoporous zones with a macroporous zone disposed between them, e.g., a sandwich membrane.

It is to be understood that the two aforementioned zones are generally not completely discrete from one another. Rather, there is a gradient along a portion of the membrane in which the pores transition from nanopores to macrovoids. This transition zone can have a thickness of approximately 0.1-5%, 0.25-5%, 0.5-5%, 0.5-2.5%, 1-2.5%, 0.1-1.0% or 0.1-0.5% the total thickness of the asymmetric membrane.

In some instances, the transition zone can have a thickness of approximately 1-10%, 1-7.5%, 1-5.0%, 2.5-5%, 2.5-7.5%, 5.0-7.5%, or 5.0-10% the total thickness of the asymmetric membrane.

In some embodiments, the asymmetric membrane can include one or more additional skin layers. These skin layers can include asymmetric membranes, including carbonaceous asymmetric membranes. These skin layers can be directly adjacent to the asymmetric membrane, either on one or both sides of the asymmetric membrane, e.g., sandwich skin layers. The carbonaceous membranes can include mixtures of amorphous and (para)crystalline carbon. In certain embodiments, the skin layers can include a conductive polymer. Exemplary conductive polymers include a polythiophene, a polypyrrole, a polyaniline, or polyfuran. The skin layer(s) can be about 0.001-10 µm thick, about 0.01-5 µm thick, about 0.05-5 µm thick, about 0.1-5 µm thick, about 0.25-5 µm thick, about 0.5-5 µm thick, about 0.25-2.5 µm thick, about 0.5-2.5 µm thick, or about 1.0-2.5 µm thick.

The asymmetric membranes can be characterized by a surface area of at least about 5 $m^2/g$, at least about 10 $m^2/g$, at least about 15 $m^2/g$, at least about 20 $m^2/g$, at least about 25 $m^2/g$, at least about 30 $m^2/g$, at least about 40 $m^2/g$, at least about 50 $m^2/g$, at least about 60 $m^2/g$, at least about 70 $m^2/g$, at least about 80 $m^2/g$, at least about 90 $m^2/g$, at least about 100 $m^2/g$, at least about 200 $m^2/g$, at least about 300 $m^2/g$, at least about 400 $m^2/g$, or at least about 500 $m^2/g$. The surface area can be determined using a surface area analyzer combined with BET (Barrett, Joyner, and Halenda) calculation method.

The asymmetric membranes can be prepared by a phase-inversion process. A lithium storage material can be combined with polymers that are dissolved in a water soluble organic solvent. The resulting mixture can be then be layered on a substrate at desired thickness and immersed in a non-solvent to obtain a porous film. The film can be converted to an electrically conductive membrane by carbonizing the lithium storage material-polymer composite membrane in inert gases.

As used herein, the term amorphous carbon source refers to a material that when carbonized (e.g., heated to a temperature greater than 600° C., preferably greater than 800° C.) under an inert atmosphere, yields amorphous carbon. Exemplary amorphous carbon source include carbonizable polymers such as cellulose acetates, phenolic resins, polyacrylonitriles, resorcinol-formaldehydes, polysulfones, polyamides, polyvinyls, and polyimides. Unless stated otherwise, the above mentioned polymers may be substituted or unsubstituted.

Suitable silicon sources include silicon powders and particles, with silicon microparticles being preferred in some embodiments. Silicon microparticles can have an average particle size from 0.1-10 µm, 0.1-5 µm, 0.5-5 µm, or 0.5-2.5 µm. Suitable tin dioxide sources include tin oxides nanoparticles, tin alkoxides, tin acetates, tin acetoacetates, for instance $SnO_2$, $Sn(OR)_4$, $Sn(acac)_2$ or $Sn(OC(=O)R)_4$, wherein R is independently selected from $C_{1-8}$ alkyl. Suitable vanadium pentoxide sources include vanadium oxides nanoparticles, vanadium alkoxides, vanadium acetates, vanadium acetoacetates, for instance $VO_2$, $V_2O_5$, $V(OR)_4$, $V(=O)(OR)_3$, $V(acac)_2$ or $V(OC(=O)R)_4$, wherein R is independently selected from $C_{1-8}$ alkyl.

Exemplary water soluble organic solvents include N-methylpyrrolidine (NMP), dimethylformamide (DMF), dimethylsulfoxide (DMSO), tetrahydrofuran (THF), diethyl ether ($Et_2O$), $C_{1-4}$ carboxylic acids, halogenated $C_{1-4}$ carboxylic acids, acetone, methylethyl ketone (MEK) ethyl acetate (EtOAc), and $C_{1-4}$ alkyl alcohols, include di and tri alcohols like ethylene glycol and glycerol. The water soluble organic solvent can include mixtures of two or more solvents.

The non-solvent can be water or any water soluble solvent that is more polar than the water-soluble organic solvent.

The substrate can be either hydrophobic (e.g., silicon wafer or hydrophobic polymer/plastic) or hydrophilic (glass or hydrophilic polymer, e.g., cellulose paper). Use of a hydrophobic substrate leads to an asymmetric membrane having a nanoporous zone on one side of the macrovoid zone, whereas a hydrophilic substrate can give an asymmetric membrane having nanoporous zones on both sides of the macrovoid zone.

After the coated substrate is immersed in the non-solvent, the porous film can be separated from the substrate. Residual water or solvent can be removed by immersing or washing the film with a volatile, water soluble organic solvent followed by drying. After removal of the water, the asymmetric membrane can be formed by carbonizing the film. Exemplary carbonization condition include heating to a temperature of at least 600° C., at least 700° C., at least 800° C., at least 900° C., or at least 1,000° C., under an inert atmosphere (e.g., He or Ar) for a period of at least 0.5 hours, 1 hour, 2 hours, 3 hours, 4 hours or 5 hours. In certain instances, the temperature ramp for the carbonization is no greater than 100° C./min, no greater than 90° C./min, no greater than 80° C./min, no greater than 70° C./min, no greater than 60° C./min, no greater than 50° C./min, no greater than 40° C./min, no greater than 30° C./min, no greater than 20° C./min, or no greater than 10° C./min.

Carbonaceous skin layers can be applied to the asymmetric membrane prior to carbonization by coating or dipping the film in a mixture of amorphous carbon or amorphous carbon source, (para)crystalline carbon, and water soluble organic solvent, followed by phase inversion in a suitable anti-solvent. Coating one layer of the film yields a single skin on one side of the asymmetric membrane, while coating on both sides (or dipping) yields skin layers on both sides of the asymmetric membrane. The coated film can then be carbonized to yield the double or triple layered asymmetric membrane.

In another embodiment, after the carbonization process has been performed, a conductive polymer skin can be applied to one or both sides of the membrane by either manual coating or dip coating method using a conductive polymer solution of 5-15% wt. %.

Also disclosed herein are anodes, in particular anodes for lithium batteries, containing asymmetric membranes. The anode includes at least a current conductor and an asymmetric membrane affixed thereto. In instances of asymmetric membranes having a single nanoporous zone, the nanoporous zone is disposed on the face of the membrane facing away from the current collector.

The current collector can include a conductive metal, for instance a conductive metal foil. Exemplary conductive metals include copper and nickel. The asymmetric membrane can be affixed to current collector by means of an adhesive. In some embodiments, the adhesive can further contain (para)crystalline carbon. Exemplary adhesives includes polyacrylic acid, polyvinylidene fluoride, epoxy based agents, low density polyethylene and the like.

The anode described herein can be advantageously employed in a lithium ion battery, either a primary or secondary battery. In addition to the anode, such battery systems can include a cathode, an electrolyte, and a separator between the cathode and anode. The electrolyte can include at least one lithium salt and non-aqueous solvent. Suitable lithium salts include LiClO$_4$, LiPF$_6$, LiBF$_4$, LiAsF$_6$, LiSO$_3$F, and LiCF$_3$SO$_3$. Suitable non-aqueous solvents include carbonates such as ethylene carbonate, dimethyl carbonate, ethyl methyl carbonate, fluoroethylene carbonate, and diethyl carbonate, and mixtures thereof. One such mixture includes ethylene carbonate, dimethyl carbonate, and diethyl carbonate. Separators for lithium ion batteries are known, and typically include one or more layers of microporous polyolefin, e.g., polyethylene and/or polypropylene. The above components are assembled in a suitable housing known for lithium batteries.

Lithium batteries containing the inventive anode are characterized by reduced capacity loss over charging cycles. For instance, batteries having anodes including asymmetric membranes exhibit no less than 70%, no less than 60%, no less than 50%, no less than 40%, no less than 30%, no less than 20%, no less than 10%, no less than 5%, no less than 2.5%, or no less than 1% capacity loss after 100 charge/recharge cycles. The overall capacity of such batteries, after 100 cycles, can be at least 400 mAh/g, at least 450 mAh/g, at least 500 mAh/g, at least 550 mAh/g, at least 600 mAh/g, at least 650 mAh/g, at least 700 mAh/g, at least 800 mAh/g, at least 900 mAh/g, or at least 1000 mAh/g.

Given the high capacity and robustness of the disclosed lithium batteries, said batteries may find use in high demand battery applications, such as electric vehicles.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Synthesis of Asymmetric Membranes

Single-Layer Asymmetric Membranes 0.75 g of polyacrylonitrile (PAN) (M$_n$=150,000; Pfaltz & Bauer) was dissolved in 11 mL N-methyl-2-pyrrolidone (NMP) (Sigma Aldrich, >99.5%) using a sonic bath (Bransonic CPX3800H) for 1 hr. Next, 0.25 g of as-received Si powder (American Elements, ~1 µm) and 0.20 g carbon black (TIMCAL SUPER C45 with a surface area of 45 m$^2$/g) were added to the solution and dispersed using a sonic bath for 2 hrs. After sonication, the homogenous solution was then coated onto a silicon (100) wafer (2 in. diameter) using a doctor blade set to deliver a wet coating thickness of 100 µm. Next, the coated wafer was immersed in deionized water for phase inversion. The membrane was left in DI water for 30 minutes and then placed in ethanol for another 30 minutes to remove residual moisture. Finally, the membrane was carbonized at 800° C. for 2 hours in a tube furnace (Lindberg/Blue M™ 1100° C.) and under the protection of helium gas (99.9999%, Airgas He UHP300) with a flow rate of 200 sccm. The temperature was ramped at rate of ~60° C./min. These membranes are labeled PAN/Si herein.

Double-Layer Asymmetric Membranes (Single Skin Layer)

A mixture of 0.75 g of cellulose acetate (Mn=15,000; Acros) and 0.2 g of carbon black was dispersed in 5 mL of acetone using a sonic bath for 1 hr. This mixture was then coated on the top of the un-carbonized PAN/Si membrane using a doctor blade set to ~25 µm. Next, the coated membrane was placed into ice cold ether (ACS Grade, EMD Millipore Corporation) for phase inversion to generate a double-layer asymmetric membrane. Lastly, the membrane was carbonized at 800° C. for 2 hours in a tube furnace and labeled as PAN/Si/CA herein.

Triple-Layer Sandwich Asymmetric Membranes (Two Skin Layers)

First, 1.2 g of cellulose acetate and 0.4 g carbon black were dispersed in 15 mL acetone to make a suspension. Next, un-carbonized PAN/Si asymmetric membrane was dipped directly into the suspension and then withdrew slowly out of the suspension. In the next step, the dip-coated membrane was immersed into ice cold ether to form a triple-layer sandwich asymmetric membrane. Similarly, the triple-layer sandwich asymmetric membrane was carbonized at 800° C. for 2 hours in a tube furnace and labeled CA/PAN/Si/CA.

Control Membranes

Asymmetric membranes containing no Si MPs were prepared using the aforementioned method for control experiments. The membranes were carbonized at 800° C. for 2 hours and labeled as PAN.

Example 2: Characterization of Asymmetric Membranes

A field emission scanning electron microscope (JEOL JSM-7600F) equipped with a transmission electron detector (TED) was used for morphology and structure characterizations. Raman studies were carried out using a ThermoScientific DXR SmartRaman Spectrometer with a 10× lens magnification, 150 second collection time, a 1 mW laser of 532 nm, and a 50 µm slit aperture. Phase identification was performed using a powder X-ray diffractometer (Rigaku MiniFlex 600) at Armstrong State University. The samples were scanned using Cu K$_\alpha$ (λ=0.1542 nm) radiation with a step rate of 0.2°/sec from 10-90° 2Θ. The silicon content was determined using a thermogravimetric analyzer (TA Instruments G50 TGA). Compressed air (Ultra Zero, Airgas) with a flow rate of 20 mL/min was used as the purging gas. The temperature was ramped from room temperature to 700° C. at a rate of 10° C./min. Surface area and pore size distribution experiments were completed on a Micrometrics ASAP 2020 Surface Area and Porosity Analyzer. The surface area was calculated using Brunauer-Emmett-Teller (BET) equation and pore size distribution was determined using the Barrett-Joyner-Halenda (BJH) method. Samples were degassed at 50 µTorr for 300° C. for 30 minutes. Nitrogen adsorption and desorption was carried out at 77 K using ultra high purity nitrogen gas (Airgas UHP300, 99.9999%).

Figure 1D:
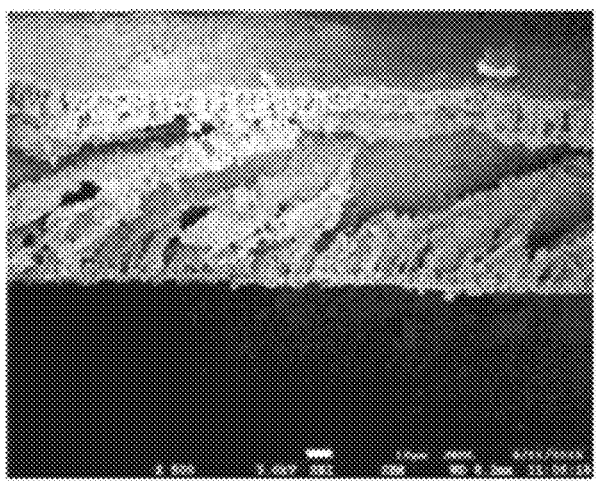
Figure 1E:
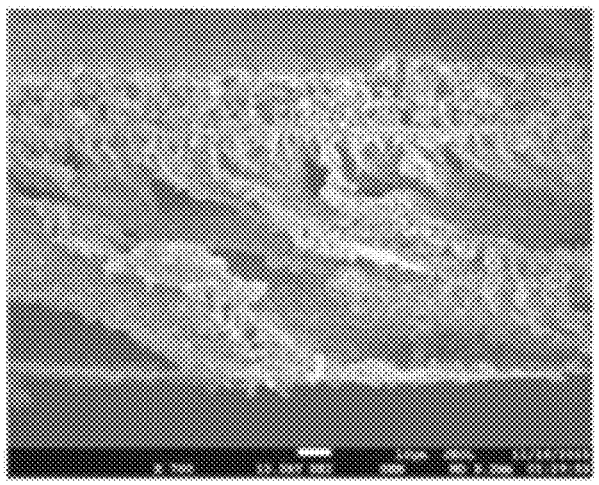
Figure 1F:
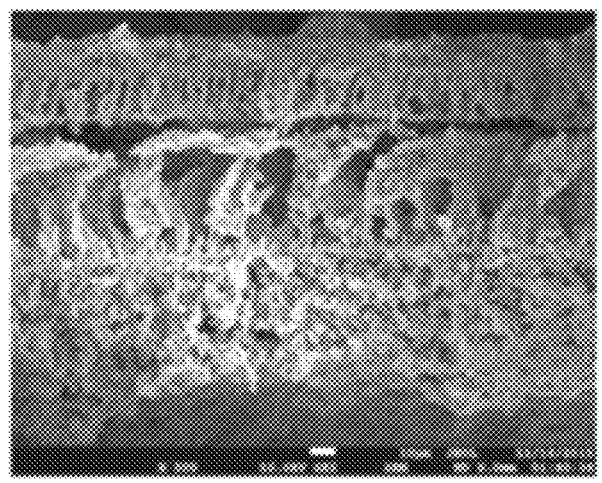
Figure 6:
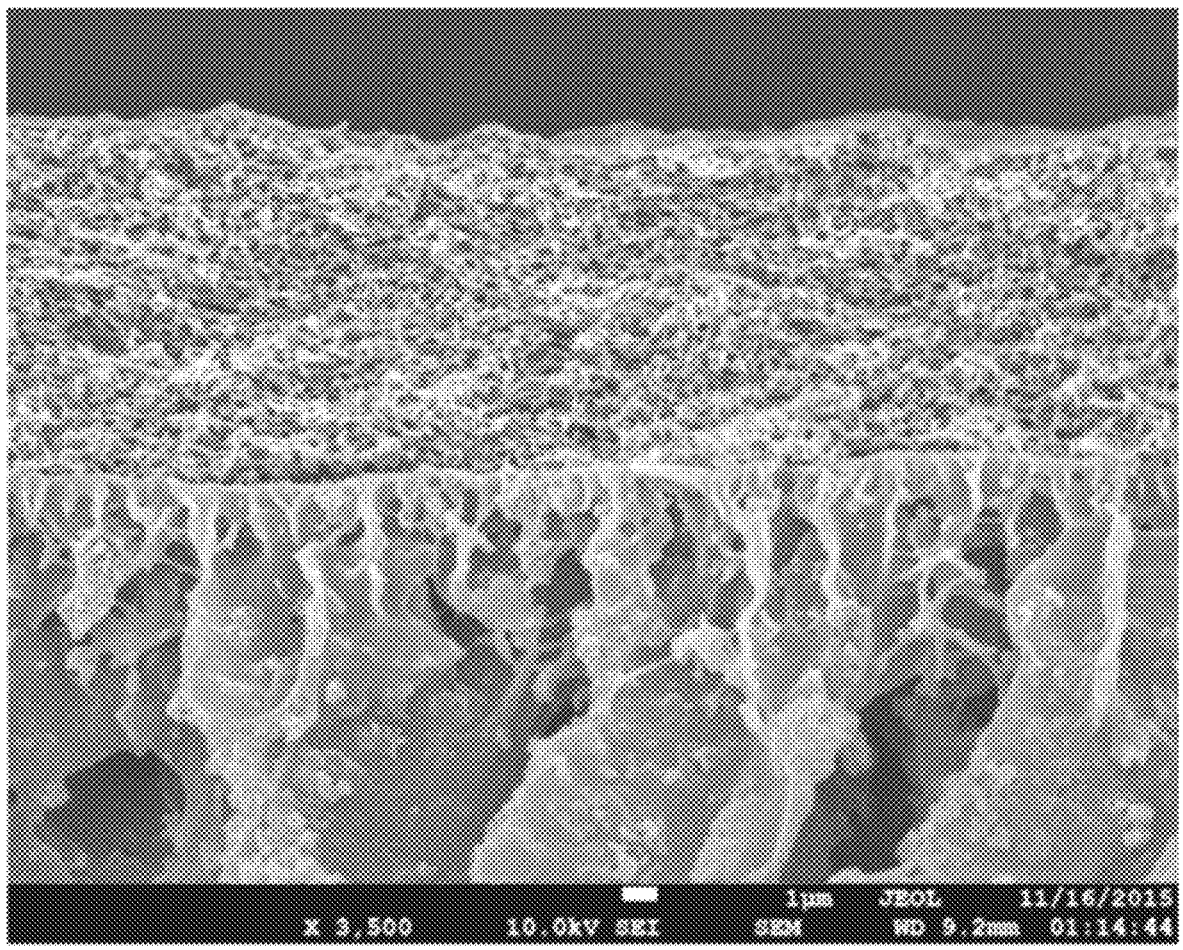
FIG. 6 includes a scanning electron microscope image of the junction between a skin layer derived from the carbonized cellulose acetate and the bottom PAN/Si layer.
Figure 7:
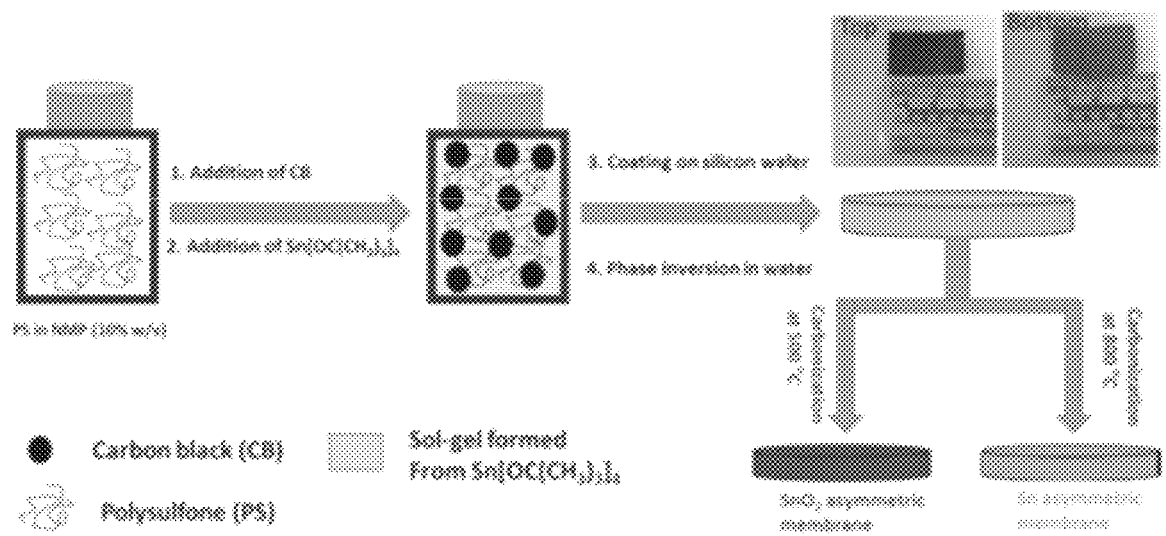
FIG. 7 includes a depiction of methods by which asymmetric tin dioxide membranes may be obtained.
Figure 8:
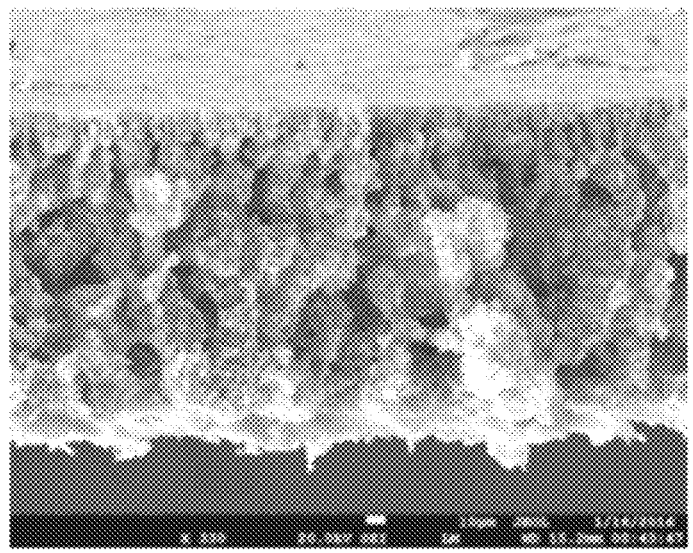
FIG. 8 includes a depiction of a scanning electron microscope image of an asymmetric tin dioxide membranes may be obtained.
Figure 9A:
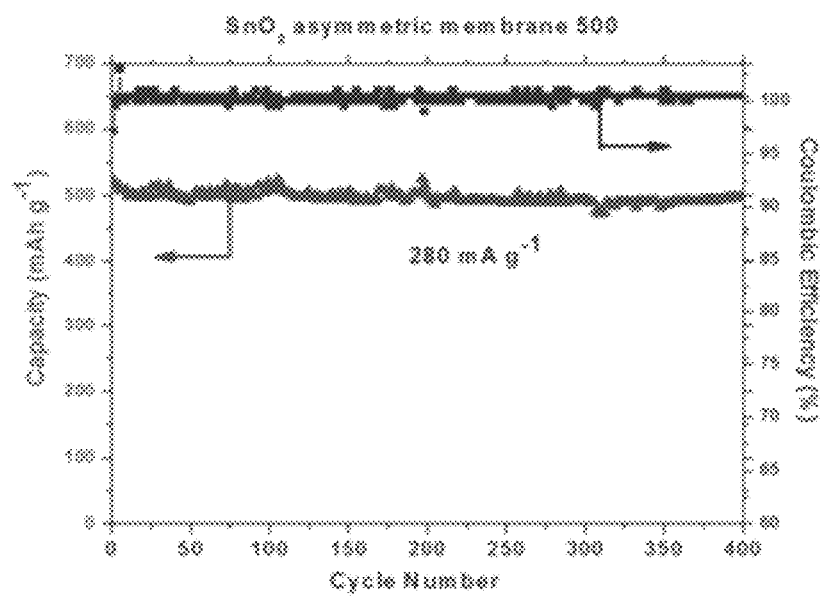
FIG. 9 includes depictions of the electrochemical performance of tin dioxide asymmetric membranes: 9A) Coulombic efficiency and cycling performance, 9B) voltage verse capacity profiles and 9C) rate performance of $SnO_2$ asymmetric membrane carbonized at 500° C. for 1 hr. Note: current density=applied current/overall membrane mass.
Figure 9B:
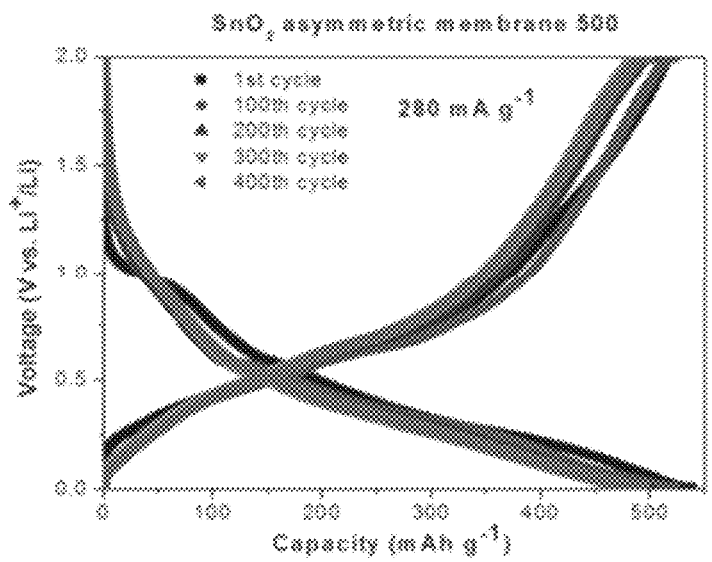
Figure 9C:
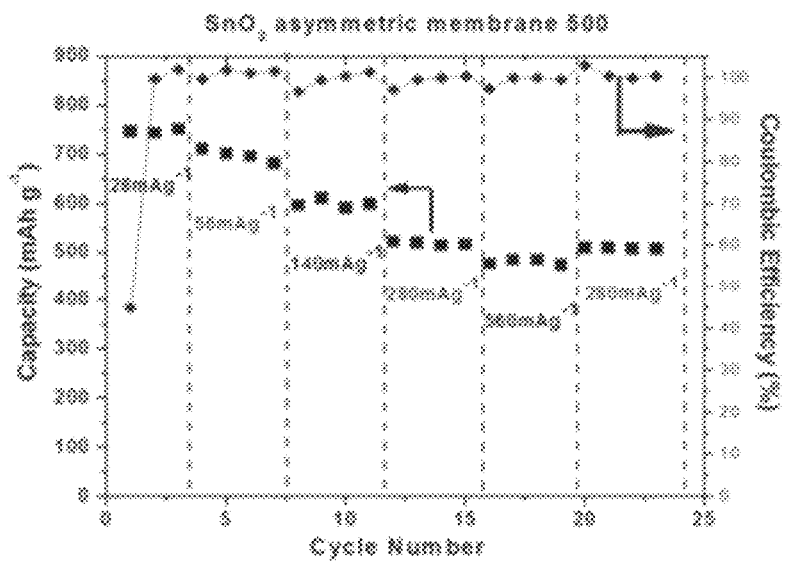
Figure 10A:
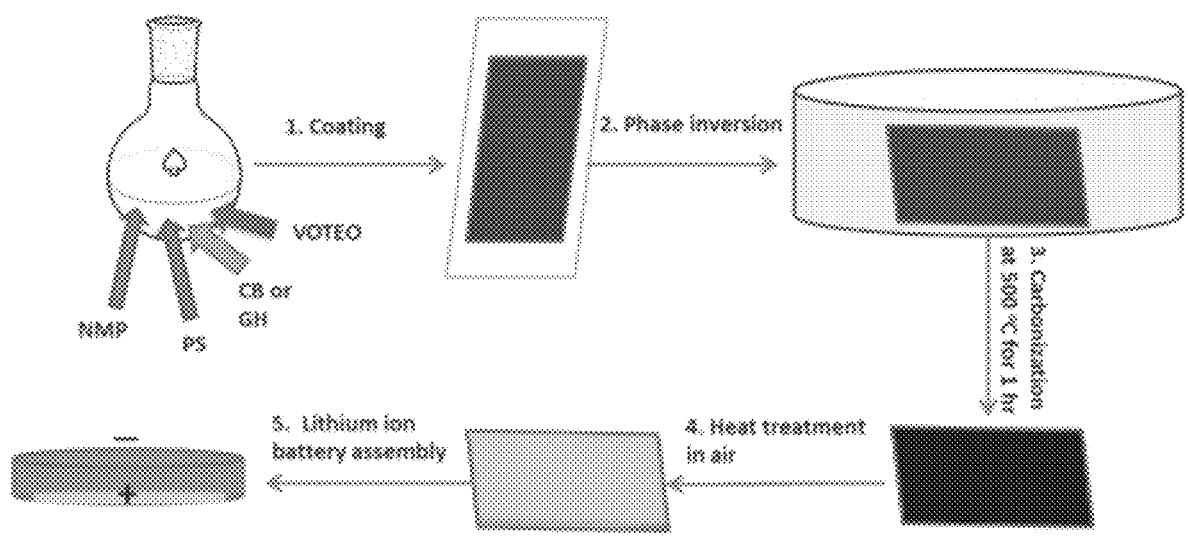
FIG. 10A includes a depiction of methods by which asymmetric vanadium pentoxide membranes may be obtained. Figure includes photographic (10B) and SEM images (10C) of an asymmetric vanadium pentoxide membrane.
Figure 10B:
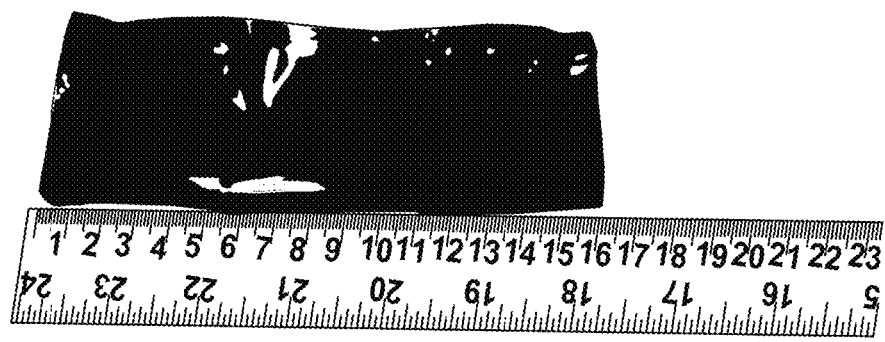
Figure 10C:
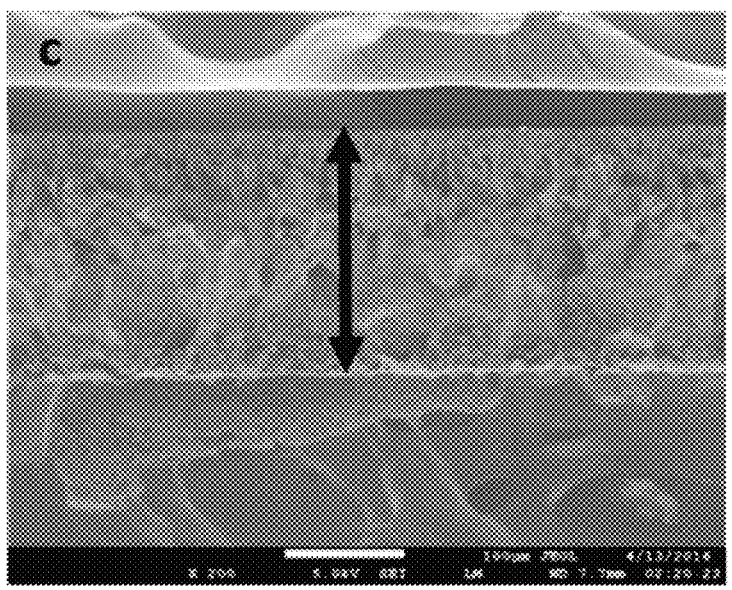
Figure 11A:
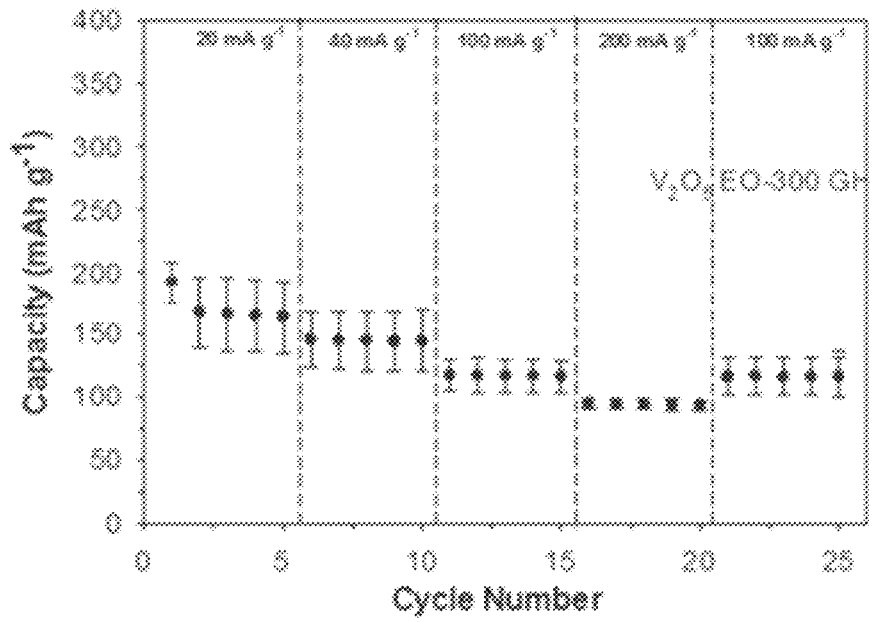
FIG. 11 includes depictions of the electrochemical performance of vanadium pentoxide asymmetric membranes: Electrochemistry data of $V_2O_5$ asymmetric membrane electrodes 11A) C-rate performance, 11B) long term performance at a current density of 100 mA $g^{-1}$, 11C) voltage profiles of $V_2O_5$ EO-300 GH membranes at 100 mA $g^{-1}$ at 1st and 380th cycles, whose capacities are normalized to their corresponding maximum capacities for convenient polarization comparison. The standard deviation bars in 11A) were obtained from three pieces of membranes of each type. $V_2O_5$ EO-300 CB and $V_2O_5$ EO-400 CB are control samples prepared using carbon black instead of graphene as the additives, which are annealed in air at 300 and 400° C., respectively.
Figure 11B:
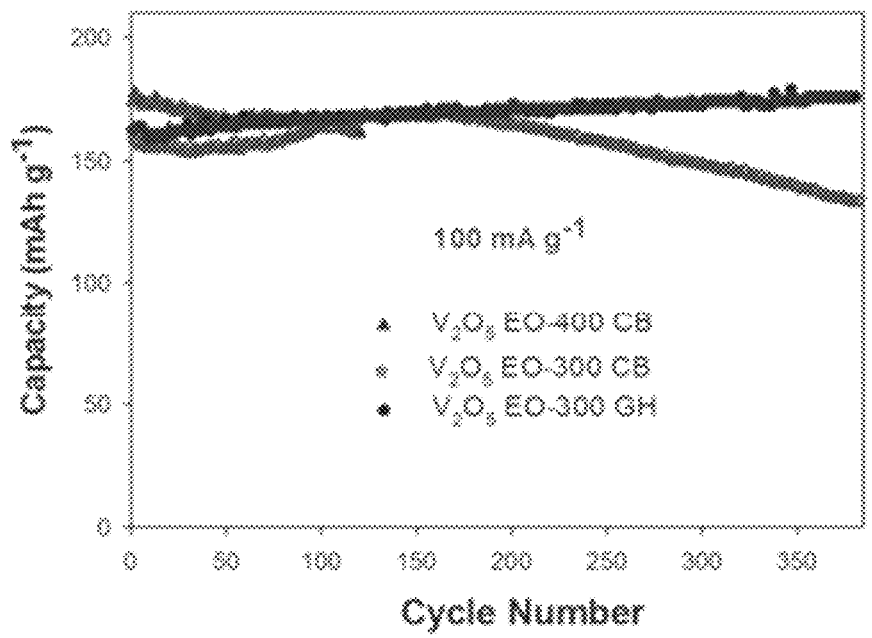
Figure 11C:
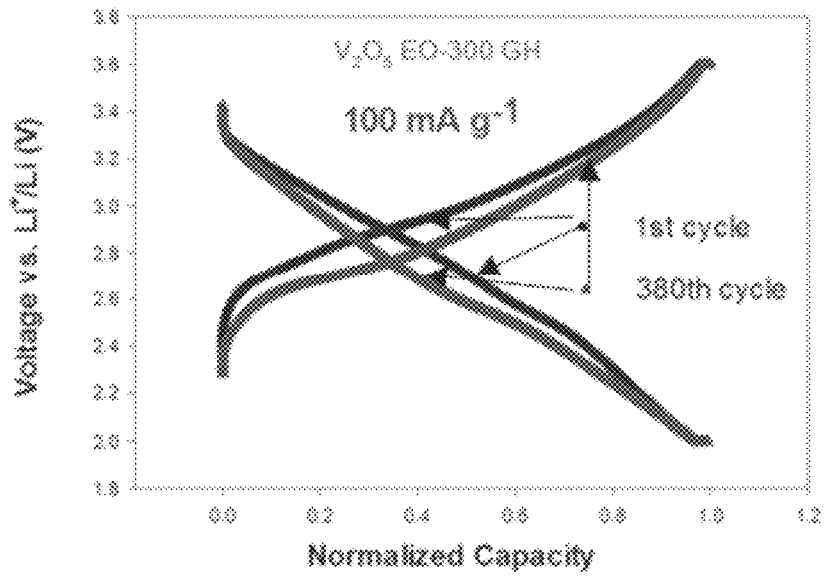

Because Si MPs have irregular shapes, Heywood diameter $$\left(d_p = 2\sqrt{\frac{A}{\pi}}\right)$$

is used to represent the size of these particles, where A is the area of the particle determined from TEM images using ImageJ software. The average diameter of Si MPs for this study was calculated to be ~1.01 μm with a standard deviation of ~0.60 μm. SEM images reveal that single-layer asymmetric membrane containing Si MPs possesses a unique asymmetric structure after the phase inversion process (FIG. 1a). The porous asymmetric structure is successfully maintained even after the high temperature treatment (FIG. 1d). It can be clearly seen that large pores with a width of ~10 μm are sandwiched between two nanoporous skin layers (FIG. 1a). The thickness of single-layer PAN/Si membrane was shrunk from initial 100 μm to ~80 μm after the phase inversion process due to the loss of solvent after the de-mixing. After being carbonized, the PAN/Si membrane thickness was further decreased to ~65 μm (FIG. 1d). FIGS. 1b, 1c, 1e and 1f depict asymmetric silicon membranes having or one or two skin layers. The high resolution SEM image (FIG. 6) shows that the junction between the top carbonaceous layer derived from the carbonized cellulose acetate and the bottom PAN/Si layer is nearly seamless, which is beneficial to an efficient electron transfer across the boundary.

Figure 2A:
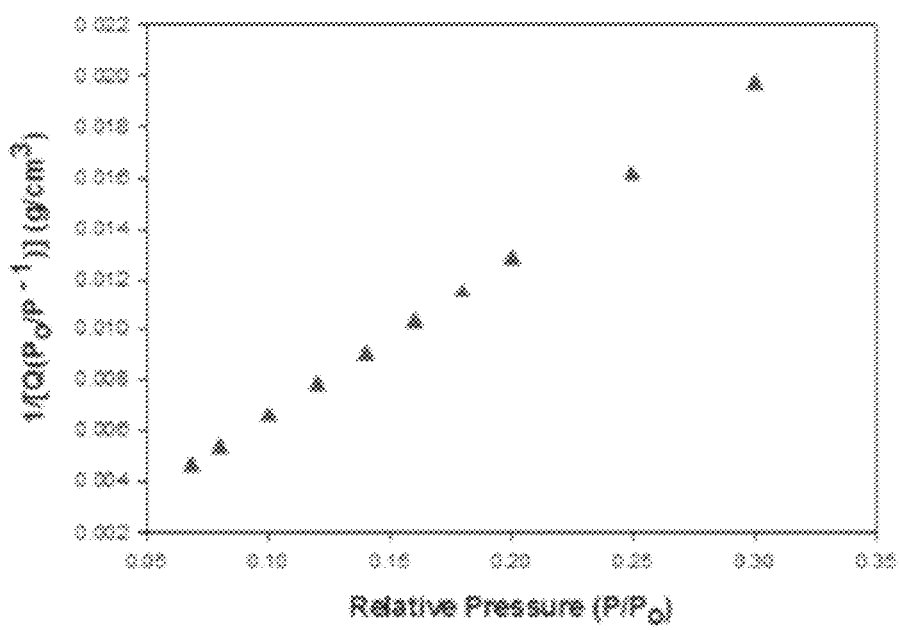
FIG. 2 includes 2A) surface area plot of CA/PAN/Si/CA used to generate slope to input into BET equation; 2B) pore size distribution of CA/PAN/Si/CA.
Figure 2B:
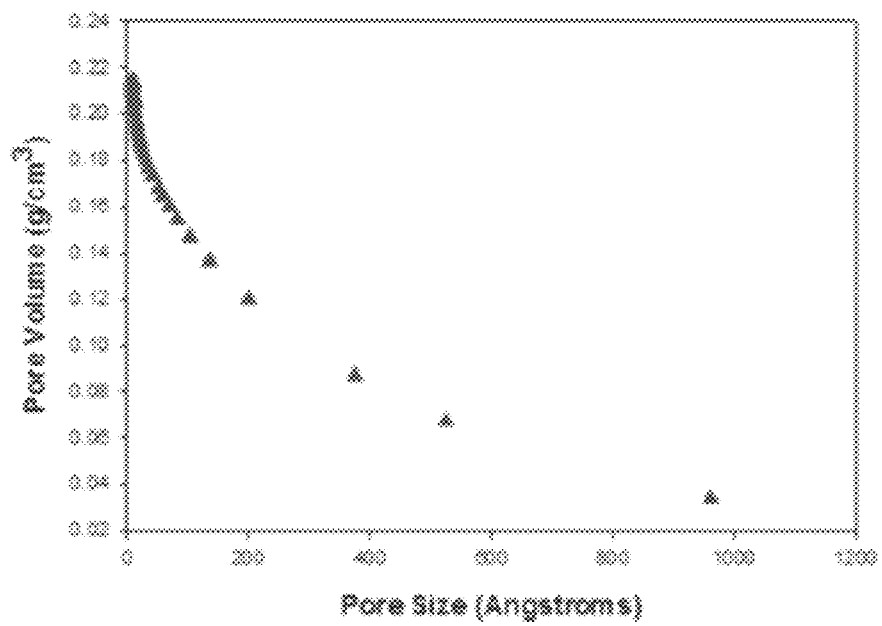

The surface area and porosity were calculated using the BET equation and BJH method, respectively. The surface area of CA/PAN/Si/CA membranes is 67.4 m$^2$/g. Double layer asymmetric membranes have a surface area of 59.6 m$^2$/g. Single membranes have the lowest surface area of 36.4 m$^2$/g. The increased surface area with additional carbon coating can be caused by the high porosity of the carbonaceous layer (FIG. 2). The pore size distribution data shows the majority of pores are under 40 nm in diameter. The distribution also shows there are some large pores over 40 nm in diameter as well.

Figure 3A:
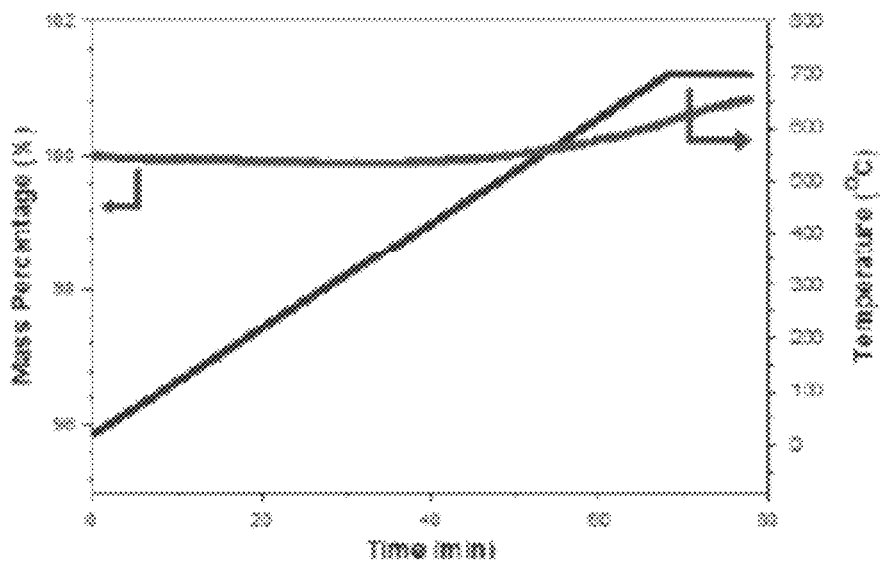
FIG. 3 includes a depiction of the thermogravimetric analysis of: 3A) Si MP; 3B) carbonized PAN; 3C) carbonized PAN/Si; 3D) carbonized CA/PAN/Si; 3E) carbonized CA/PAN/Si/CA.
Figure 3B:
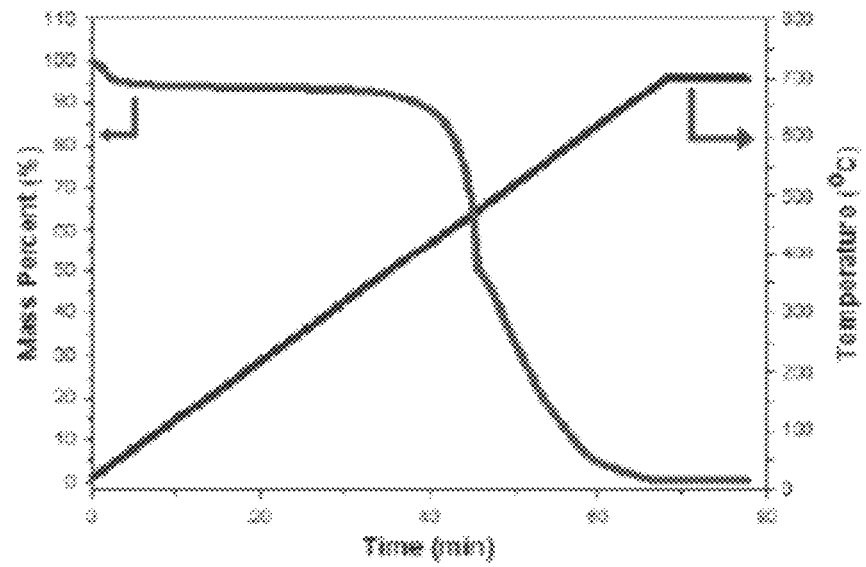
Figure 3C:
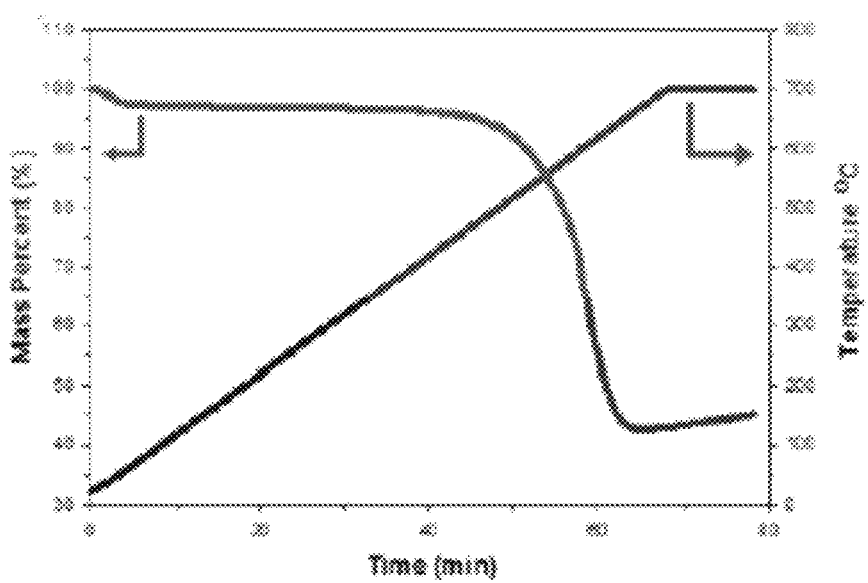
Figure 3D:
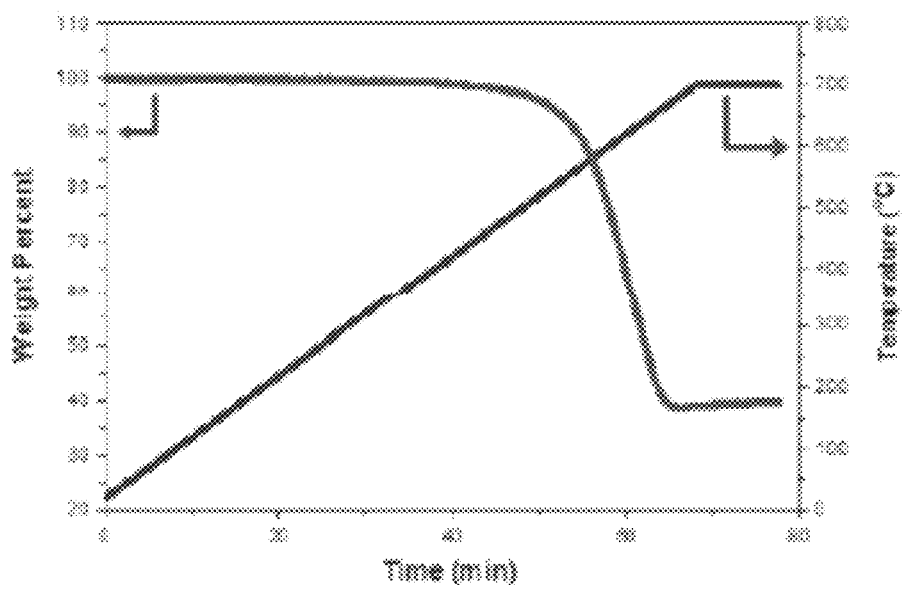
Figure 3E:
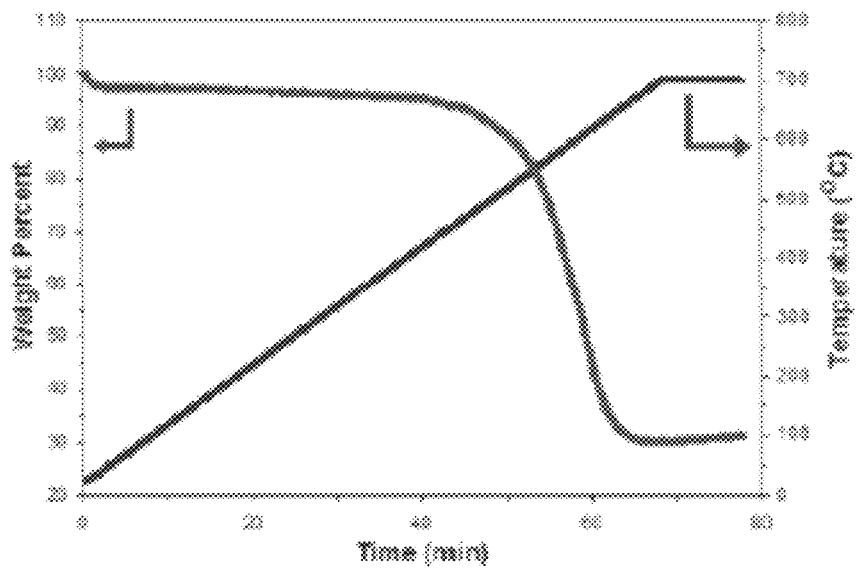

The silicon content in asymmetric membranes was determined by using a Thermogravimetric Analyzer (TGA), assuming that carbon can be fully oxidized into $CO_2$ gas and Si is only slightly oxidized under our TGA conditions. It was found that there is a 99.7% mass loss for control PAN/CB membrane that is made of pure carbon (FIG. 3b). Under the same TGA analytical conditions, the mass of pure Si MPs is only increased by less than 1.0%, confirming that Si can't be oxidized significantly below 700° C. in air (FIG. 3a). Based on this assumption, the contents of silicon by mass in PAN/Si single-layer, CA/PAN/Si double-layer and CA/PAN/Si/CA triple-layer (sandwich) membranes are 46.0%, 39.6% and 34.6%, respectively (FIG. 3c-3e). The gradual decrease in Si content from single-layer to triple-layer asymmetric membranes is due to the addition of extra carbonaceous coatings that do not contain Si particles.

Figure 4A:
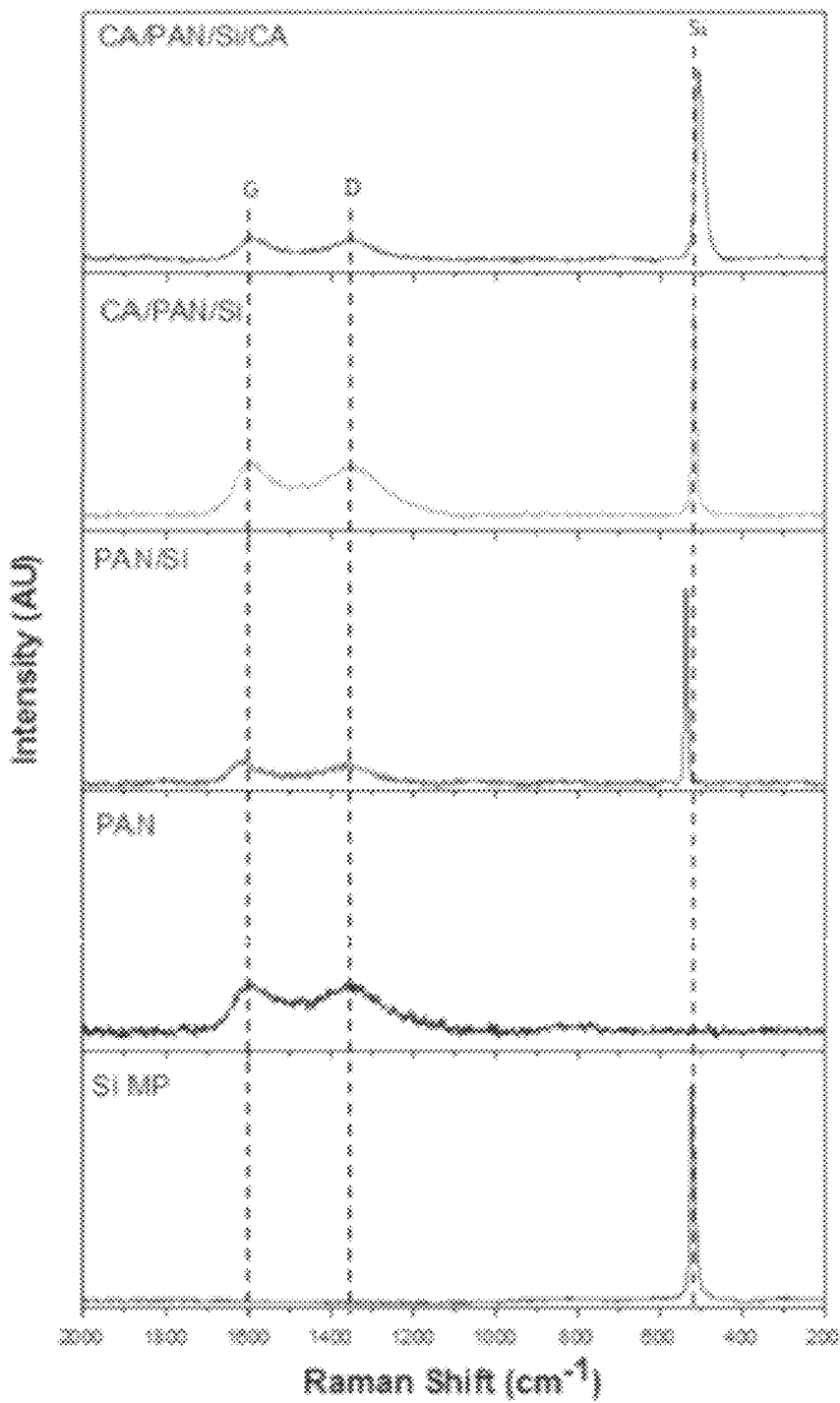
FIG. 4 includes a depiction of the 4A) combined Raman spectra of as-received Si MP and all carbonized membranes; 4B) combined PXRD diffraction patterns of as-received Si MP and all carbonized membranes (note: Si:**, graphite: G).
Figure 4B:
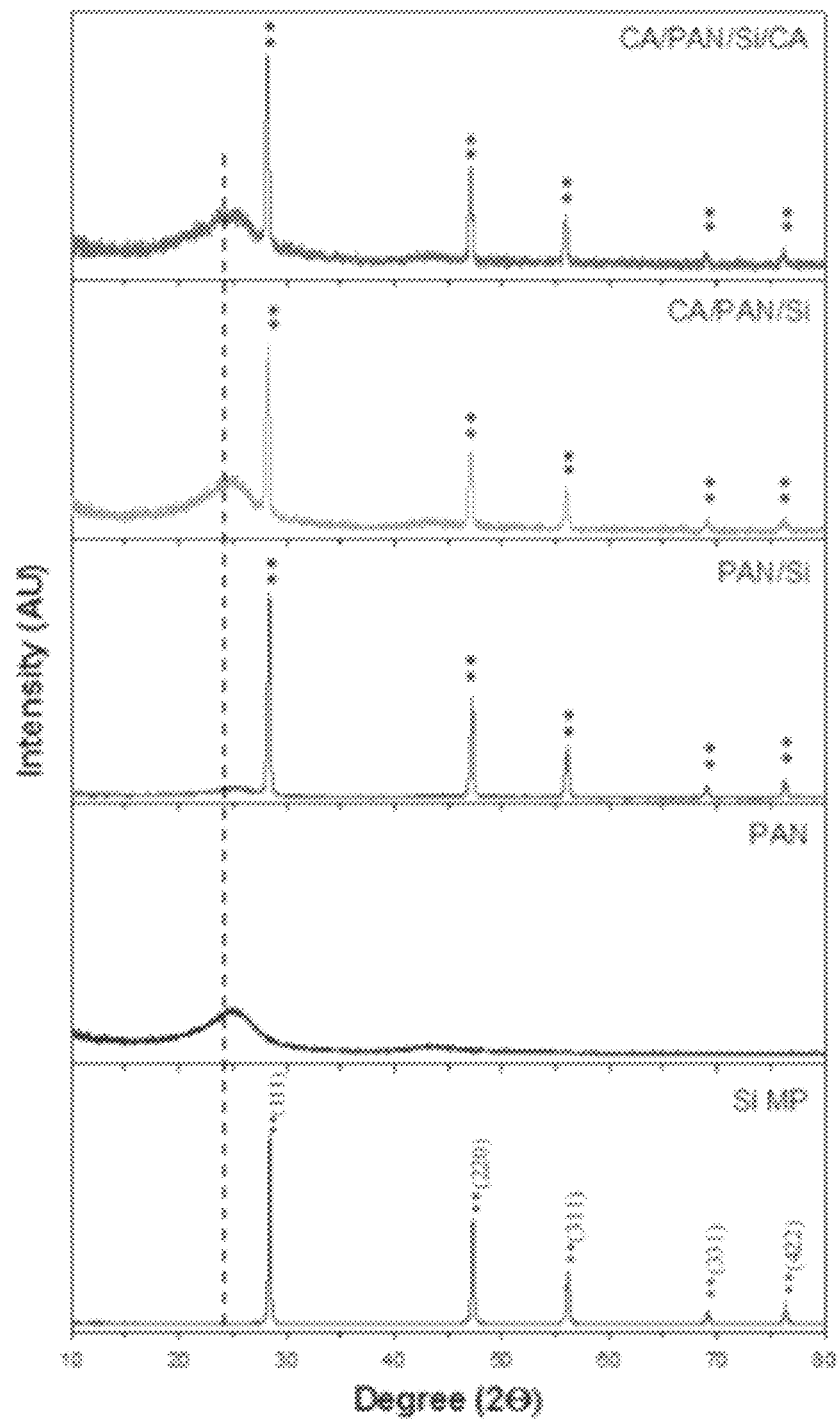

A sharp Raman peak around 520 cm$^{-1}$ can be seen for all samples containing Si MPs (FIG. 4a), confirming the presence of cubic Si. All samples except for the pure Si MPs show distinct G and D peaks centered around 1600 cm$^{-1}$ and 1365 cm$^{-1}$, respectively, which are originated from carbonaceous materials in these membranes. Powder X-ray diffraction (PXRD) patterns of various carbonized membranes and pure Si MPs are shown in FIG. 4b. Characteristic patterns from cubic phase Si (111), (220), (311), (400), (331) and (422) crystal planes were observed (JCPDS-ICDD No. 27-1402). A broad pattern centered at ~26° can be seen from all types of membranes, being consistent with the weak G/D peaks in their corresponding Raman Spectra. The intensity of the pattern at 26° increases gradually from single-layer to triple-layer asymmetric membrane due to the increasing amount of carbon as determined by TGA analysis (FIG. 4b).

Example 3: Electrode Preparation and Electrochemical Analysis

Asymmetric membranes were glued to a copper current collector (15 mm diameter, 11 μm thickness; MTI Corporation) using a suspension made of 0.15 g carbon black and 0.15 g of polyacrylic acid (PAA; Aldrich) in 4 mL of ethanol to make the electrodes. Electrodes were then dried in an oven of 100° C. for at least 4 hours to remove residual moisture and ethanol. In the next step, these dried electrodes were assembled into 2032 coin cells (MTI Corporation) using Li metal as the counter electrode and an electrolyte consisting of 1 M LiPF$_6$ dissolved in ethylene carbonate (EC), dimethyl carbonate (DMC), and diethyl carbonate (DEC) with a 1:1:1 v/v ratio (MTI Corporation). A polypropylene/polyethylene membrane with pore size of 0.21× 0.05 μm (MTI Corporation) was used as separator. For Si MP coin cell batteries (control sample), 80 wt. % Si MPs, 10 wt. % PAA and 10 wt. % carbon black were sonicated for 2 hours to create a homogenous slurry. The slurry was coated onto a copper foil using a doctor blade with a wet coating thickness of 100 μm. After being dried, the foil was punched into 15 mm diameter disks and then assembled into coin cells using the same method as mentioned above. The whole battery assembly was carried out in an argon filled glove box (LCPW, LC Technology Solutions, Inc.) with both oxygen and water content <1 ppm. Galvanostatic cycling of the LIBs was carried out on a Bio-Logic VMP3 multi-channel potentiostat with a voltage window of 0.01-1.50 V vs. Li$^+$/Li. Three formation cycles at a current density of 100 mA/g were carried out on all coin cell batteries before any other electrochemical tests.

Figure 5A:
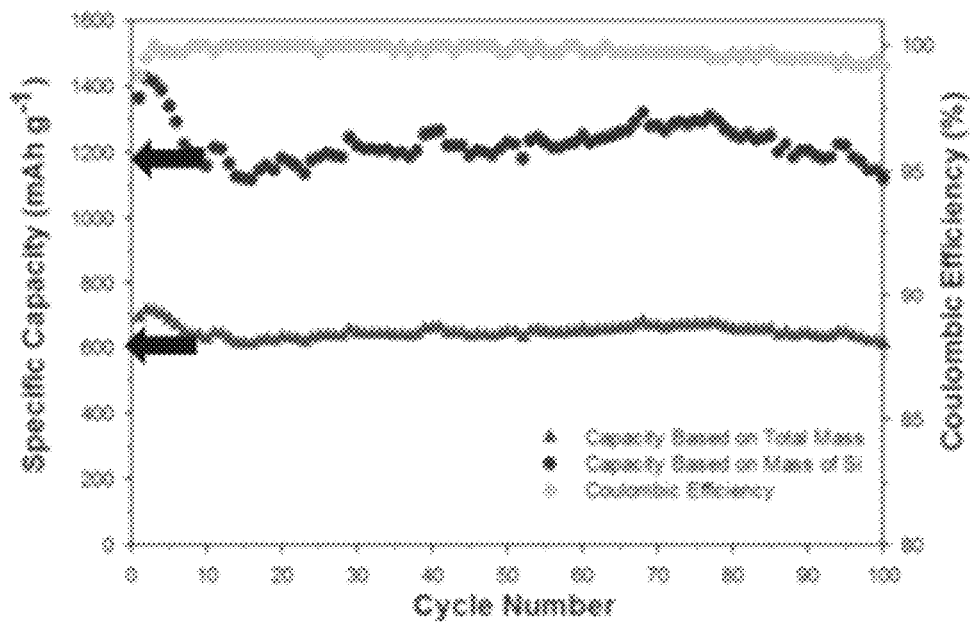
FIG. 5 includes a depiction of 5A) cycling performance and coulombic efficiency of CA/PAN/Si/CA with specific capacity based on total electrode mass and mass of Si; 5B) combined cycling performance of all batteries with specific capacity calculated using the total electrode mass; 5C) differential voltage plot of CA/PAN/Si/CA; 5D) voltage profile of CA/PAN/Si/CA; 5E) C-Rate test of CA/PAN/Si/CA; 5F) voltage profile of all samples of the first formation cycle.
Figure 5B:
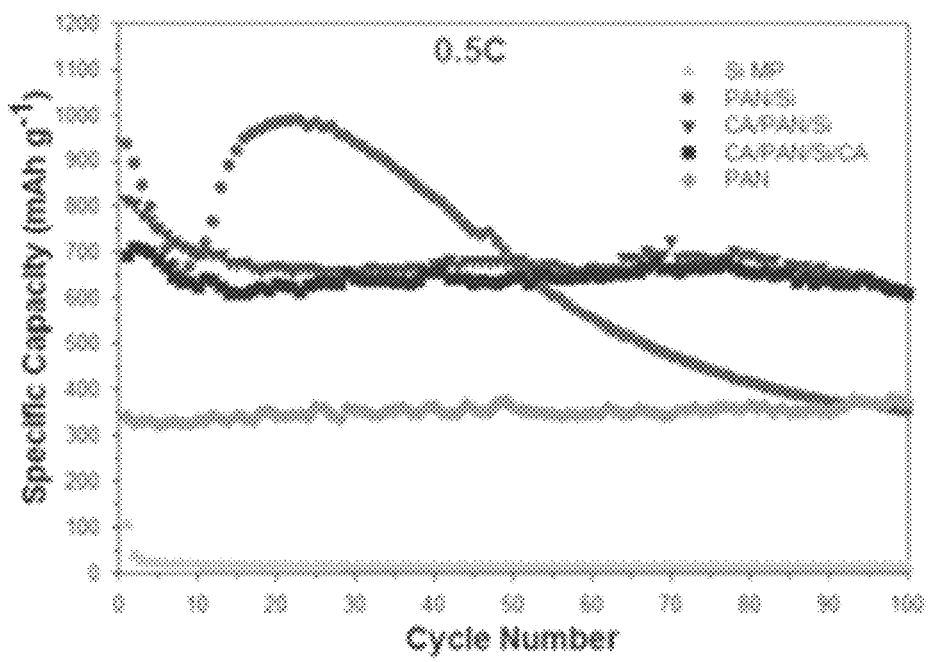

As shown in FIG. 5b, LIB anode made from single-layer PAN/Si asymmetric membrane has an initial capacity of 968 mAh/g, ~62% of which capacity can be retained after 100 cycles at a charging rate of ~0.5 C. In comparison, the cycling performance of pure Si MPs anode is extremely poor as evident by nearly 100% capacity loss in as few as five cycles (FIG. 5b). Such a dramatic difference in cyclability can be attributed to the existence of asymmetric porous structure in PAN/Si membrane, which can provide free volume for Si to expand and shrink during alloying and de-alloying. Asymmetric silicon membranes having one or more nanoporous skin layers exhibited reduced loss of charge capacity. FIG. 5b shows that double-layer CA/PAN/Si asymmetric membrane has a much improved cyclability as compared to single-layer PAN/Si asymmetric membrane. Although there is an initial capacity loss of ~18% in the first 20 cycles, the capacity maintains almost unchanged from the 20$^{th}$ to 80$^{th}$ cycle. The initial capacity of double-layer CA/PAN/Si asymmetric membrane (852 mAh/g) is slightly lower than single-layer membrane due to a lower content of silicon. The capacity retention of triple-layer CA/PAN/Si/CA asymmetric membrane is even higher (over 88% after 100 cycles) because both sides of the asymmetric membrane are protected by extra porous coatings. The overall capacity of triple-layer asymmetric membrane at the 100$^{th}$ cycle is 610 mAh/g, which is 64% larger than commercial graphite anode (372 mAh/g). The specific capacity of Si in triple-layer asymmetric membrane was calculated to be ~1976 mAh/g, assuming the capacity of carbon in the asymmetric membrane is ~340 mAh/g (FIG. 5b).

Figure 5C:
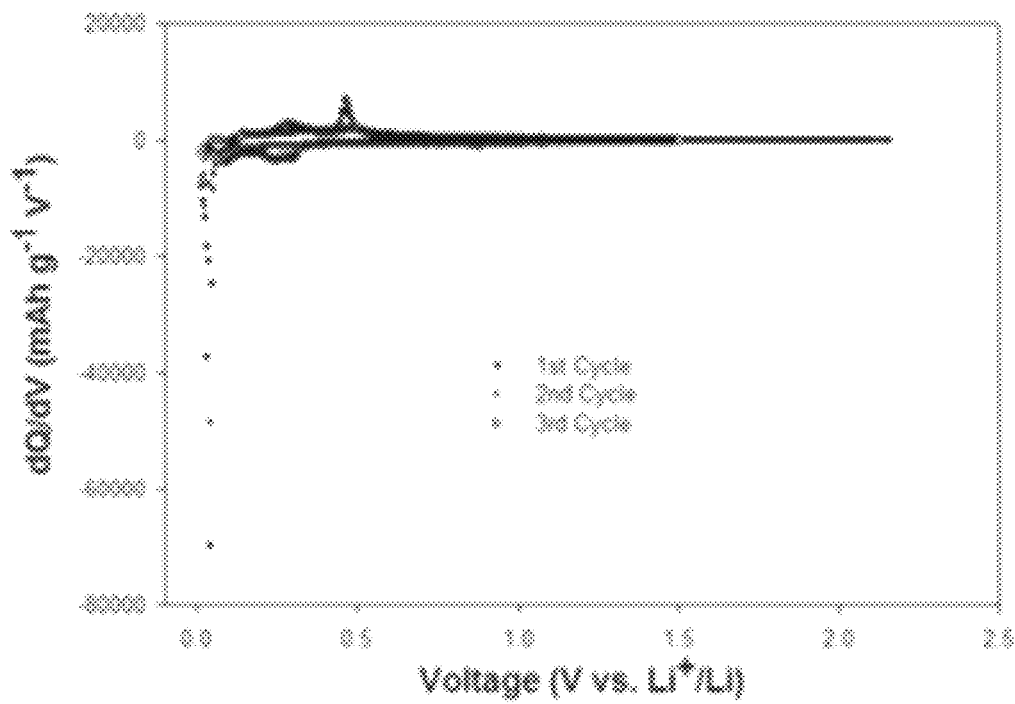
Figure 5D:
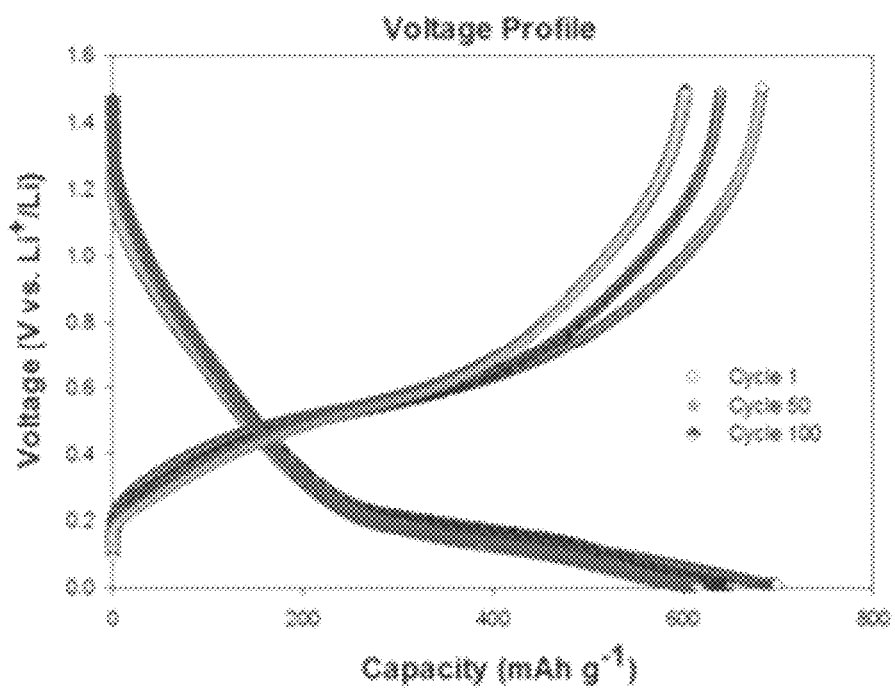
Figure 5E:
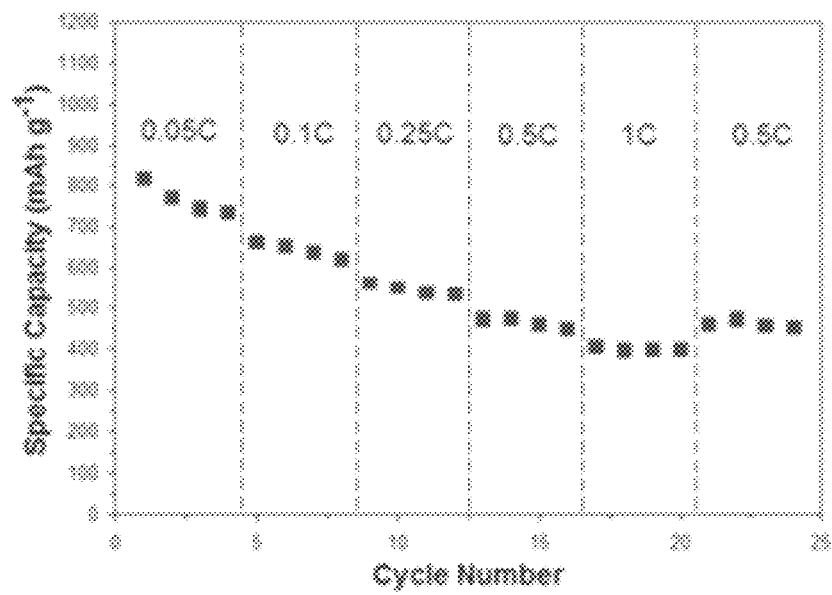
Figure 5F:
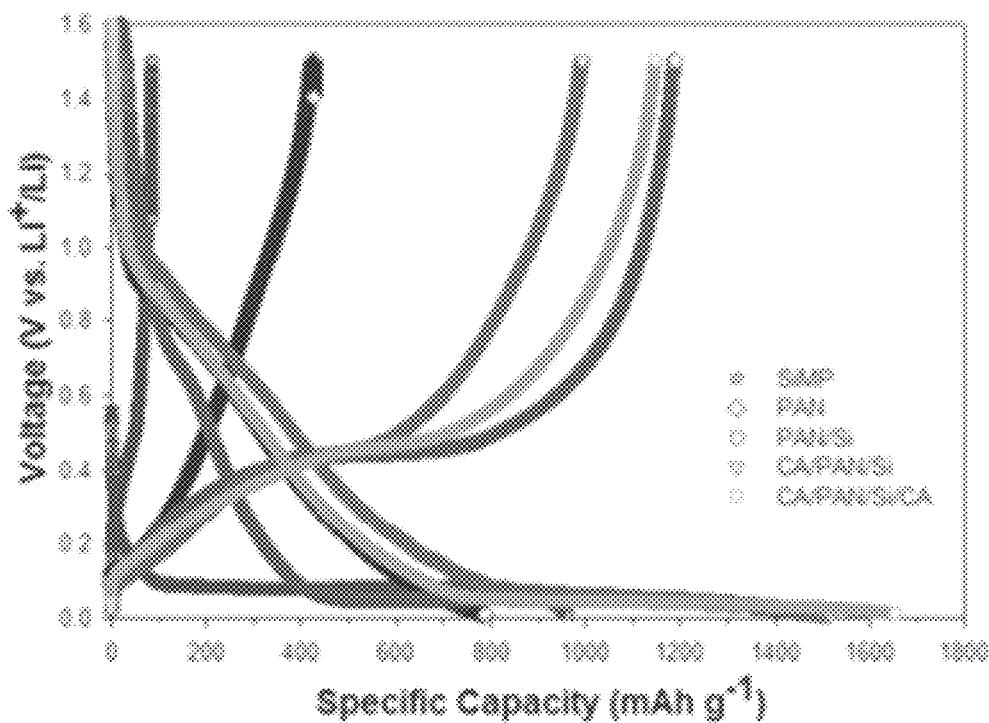

The average coulombic efficiency of triple-layer asymmetric membrane is 99.8% in 100 cycles (FIG. 5a). When the C-rate is increased from 0.05 to 0.5 C, the capacity is decreased by only ~40%. The differential capacity plot of triple-layer asymmetric membrane is shown in FIG. 5c. During the first formation cycle applying a current density of 100 mA/g, there is a sharp cathodic peak at 0.05 V, which can be attributed to the lithiation of Si MPs. A sharp anodic peak at 0.46 V can be assigned to the de-lithiation of crystalline $Li_xSi$ alloys. In the following second and third cycles these two peaks become broader due to the amorphorization of Si and $Li_xSi$ alloys. The corresponding voltage profiles are highly consistent with these differential capacity data (FIG. 5d). The voltage profile of CA/PAN/Si/CA shows a long plateau at around 0.05 V during lithiation and another long plateau can be seen at ~0.46V while being de-lithiated.

Example 4: Synthesis of $SnO_2$ Asymmetric Membranes 0.5 g polysulfone was dissolved in 10 mL N-methyl-2-pyrrolidone (NMP) under sonication. Then, 0.2 g carbon black and 1.0 g tin (IV) tert-butoxide were added to the polymeric solution. Next, the mixture was coated onto a piece of silicon (100) using a doctor blade with a wet membrane thickness of 100 μm. The coated wafer was immediately immersed into 1 L deionized water to yield asymmetric membrane. Finally, the dried asymmetric membrane was carbonized at either 500° C. or 800° C. for one hour under the protection of high purity helium. The de-lithiation capacity of $SnO_2$ asymmetric membranes carbonized at 500° C. is as high as 745 mAh $g^{-1}$ based on the overall membrane mass (C and $SnO_2$) and applying a current density of 28 mA $g^{-1}$. When the current density is increased by 20 times from 28 to 560 mA $g^{-1}$, the capacity is only decreased by 36% to 475 mAh $g^{-1}$. Such an excellent rate performance is attributed to the porous networking carbon structure that facilitates fast electron transfer and lithium ion diffusion. $SnO_2$ asymmetric membrane electrodes also demonstrate an outstanding cycling performance and Coulombic efficiency (CE), >96% retention rate in 400 cycles with an average CE close to 100%. The voltage profiles of $SnO_2$ asymmetric membrane don't change much from the $1^{st}$ cycle to the $400^{th}$ cycle, indicating the electrode is highly stable.

Example 5: Synthesis of $V_2O_5$ Asymmetric Membranes

First, 0.5 g polysulfone was dissolved in 5 mL N-methyl-2-pyrrolidone (NMP) followed by adding 0.1 g graphene (GH, cheaptube.com, >98 wt. %, 20-100 nm in diameter, >750 $m^2/g$) into the polymeric solution. Then 2.0 g vanadium (V) oxytriethoxide were mixed with the polymeric solution containing GH by 15 min vortexing and 5 min sonication. The mixture was coated onto a glass plate using a doctor blade with a wet thickness of 150 μm. The coated glass plate was immediately immersed into deionized water for phase inversion and sol-gel reaction. Finally, the asymmetric membrane was dried and carbonized at 500° C. for 1 hr under the protection of high purity helium gas to facilitate electrical conductivity while maintaining the porous structure and then heated in air at 300° C. for 1.5 hrs to retrieve vanadium (V) oxide. The asymmetric membrane was labeled $V_2O_5$ EO-300 GH herein. The membrane cathodes demonstrate excellent rate performance, which can be attributed to the high surface area, nanoporous structure and conductive carbon coating on $V_2O_5$ nanoparticles. These cathodes delivered a capacity close or above 200 mAh $g^{-1}$ at 20 mA $g^{-1}$, which is much higher than conventional ones. $V_2O_5$ EO-300 GH cathode demonstrates the most outstanding cycling performance. The capacity actually gradually increases by ~8% throughout 380 cycles, indicating that $V_2O_5$ can be more efficiently lithiated during the cycling process. It is believed that the flexible graphene networks surrounding $V_2O_5$ benefit an enhanced conductivity and structural stability, thus allowing for repeated volume expansion and efficient lithium insertion and extraction. This protection is further improved by the porous asymmetric membrane structure, resulting in excellent capacity retention and rate performance. The normalized voltage profiles show that polarization in the $V_2O_5$ EO-300 GH cathodes is very low.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A process for preparing an asymmetric membrane comprising:
    a) coating a surface of a substrate with a mixture comprising a lithium storage material or source thereof, (para)crystalline carbon, carbonizable polymer and a first solvent comprising one or more water soluble organic solvents;
    b) immersing the coated substrate in a second solvent to generate a film, wherein the second solvent is more polar than the first solvent; and c) heating the film under conditions sufficient to carbonize the carbonizable polymer.

2. The process according to claim 1, wherein the lithium storage material comprises silicon, tin dioxide, vanadium pentoxide, or a combination thereof.

3. The process according to claim 1, wherein the lithium storage material source comprises tin alkoxides, tin acetates, tin acetotacetates, vanadaium alkoxides, vanadium acetates, vanadium acetoacetates, or a combination thereof.

4. The process according to claim 1, wherein the paracrystalline carbon comprises carbon black, fullerenes, nanotubes, graphite, graphene, or mixtures thereof.

5. The process according to claim 1, wherein the carbonizable polymer comprises cellulose acetates, phenolic resins, polyacrylonitriles, resorcinol-formaldehydes, polysulfones, polyamides, polyvinyls, polyimides, or a combination thereof.

6. The process according to claim 1, wherein the first solvent comprises NMP, DMF, DMSO, THF, Et2O, a $C_{1-4}$carboxylic acid, a halogenated $C_{1-4}$carboxylic acid, acetone, MEK, EtOAc, a $C_{1-4}$alkyl alcohol, or a combination thereof.

7. The process according to claim 1, wherein prior to carbonization, further comprising:
a) contacting the as formed film with a mixture comprising:
 1) amorphous carbon or carbonizable polymer;
 2) paracrystalline carbon;
 3) a water soluble organic solvent; and
b) performing a phase inversion with a suitable antisolvent.

8. The process according to claim 7, wherein the carbonizable polymer comprises cellulose acetates, phenolic resins, polyacrylonitriles, resorcinol-formaldehydes, polysulfones, polyamides, polyvinyls, polyimides, or a combination thereof.

9. The process according to claim 7, wherein the contacting comprises immersing the film in a mixture of amorphous carbon or carbonizable polymer; paracrystalline carbon; and a water soluble organic solvent.

10. The process according to claim 7, wherein the contacting comprises coating the mixture on a single side of the film.

11. The process according to claim 1, wherein the heating is conducted at a temperature of at least 600° C. for a period of at least 0.5 hours.

12. The process according to claim 1, further comprising contacting the carbonized film with a solution comprising a conductive polymer.

* * * * *

UNITED STATES PATENT AND TRADEMARK OFFICE
CERTIFICATE OF CORRECTION

PATENT NO. : 10,864,485 B2
APPLICATION NO. : 16/566466
DATED : December 15, 2020
INVENTOR(S) : Ji Wu et al.

Page 1 of 1

It is certified that error appears in the above-identified patent and that said Letters Patent is hereby corrected as shown below:

In the Specification

Column 1, Line 63-64 "suspended in in a polymeric solution" should read "suspended in a polymeric solution".

Figure 12:
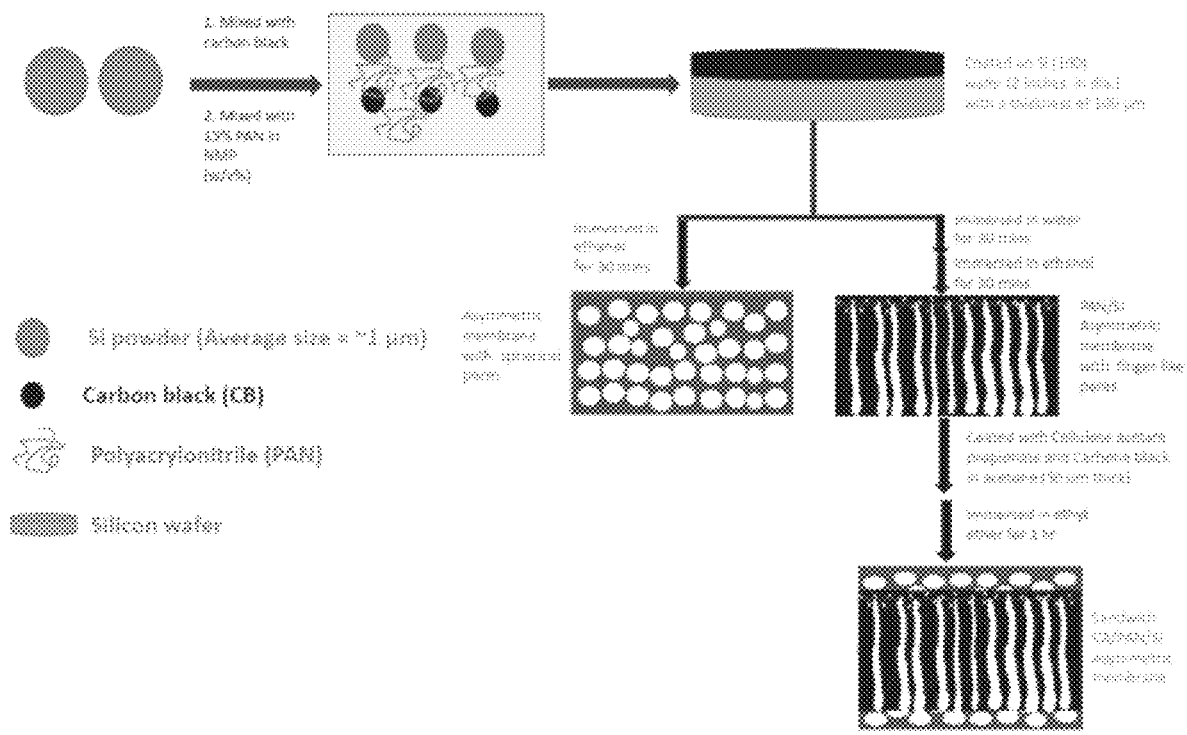
FIG. 12 includes a depiction of methods by which asymmetric tin dioxide membranes may be obtained.

Column 2, Line 61-62 "Fig. 12 includes a depiction of methods by which asymmetric tin dioxide membranes may be obtained" should read "Fig. 12 includes a depiction of methods by which asymmetric Si membranes may be obtained".

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*